US008626015B2

(12) United States Patent
Aslam et al.

(10) Patent No.: US 8,626,015 B2
(45) **Date of Patent: *Jan. 7, 2014**

(54) LARGE PARTICLE TONER PRINTER

(75) Inventors: Muhammed Aslam, Rochester, NY (US); Donald S. Rimai, Webster, NY (US); Dinesh Tyagi, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/911,984

(22) Filed: Oct. 26, 2010

(65) Prior Publication Data

US 2012/0099879 A1 Apr. 26, 2012

(51) Int. Cl.

| | |
|---|---|
| ***G03G 15/08*** | (2006.01) |
| ***G03G 13/20*** | (2006.01) |
| ***G03G 13/16*** | (2006.01) |
| ***B32B 3/00*** | (2006.01) |
| ***B32B 5/16*** | (2006.01) |
| ***B32B 7/00*** | (2006.01) |
| ***B32B 7/02*** | (2006.01) |

(52) U.S. Cl.
USPC ......... 399/53; 399/27; 430/124.1; 430/126.1; 428/206; 428/212; 428/323

(58) Field of Classification Search
USPC .................. 399/27, 28, 53; 430/124.1, 126.1; 428/206, 212, 323
See application file for complete search history.

(56) References Cited

U.S. PATENT DOCUMENTS

| | | | |
|---|---|---|---|
| 2,229,513 | A | 1/1941 | Lustig |
| 3,565,805 | A | 2/1971 | Jones et al. |
| 3,694,359 | A | 9/1972 | Merrill et al. |
| 3,716,630 | A | 2/1973 | Shirk |

(Continued)

FOREIGN PATENT DOCUMENTS

| | | |
|---|---|---|
| EP | 0 488 742 | 1/1996 |
| GB | 1117224 | 6/1968 |

(Continued)

OTHER PUBLICATIONS

Journal of Imaging Science and Tech., vol. 45, No. 2, Mar./Apr. 2001, pp. 187-197, "Toner Satellite Formation in Electrostatically Transferred Images", A. J. Rushing, R. D. Fields, D. S. Rimai, and A. Hoskins.

(Continued)

*Primary Examiner* — Joseph S Wong
(74) *Attorney, Agent, or Firm* — Roland R. Schindler, II

(57) ABSTRACT

Printers are provided for printing using large particle toner. One printer has a printer controller causing a first imaging module to form first toner image using a first toner particle having a first charge-to-mass ratio and a median volume weighted diameter between 3 um and 9 um and having a first charge-to-mass ratio and, a second imaging module to form a second toner image using second toner particles having a median volume weighted diameter that is greater than 20 um and a charge-to-mass ratio that is between ⅓ to ½ of the first charge to mass ratio of the first toner times the ratio of the median volume weighted diameter of the first toner to the median volume weighted diameter of the second toner. The first toner image is transferred to a receiver using a first electrostatic field and the second toner image is transferred using a second electrostatic field.

14 Claims, 9 Drawing Sheets

(56) References Cited

U.S. PATENT DOCUMENTS

| | | | |
|---|---|---|---|
| 3,893,935 A | 7/1975 | Jadwin et al. | |
| 3,941,898 A | 3/1976 | Sadamatsu et al. | |
| 3,983,992 A | 10/1976 | Gray et al. | |
| 4,046,990 A | 9/1977 | White | |
| 4,076,857 A | 2/1978 | Kasper et al. | |
| 4,079,014 A | 3/1978 | Burness et al. | |
| 4,085,702 A | 4/1978 | Consaul et al. | |
| 4,160,644 A | 7/1979 | Ryan | |
| 4,299,903 A | 11/1981 | AuClair et al. | |
| 4,323,634 A | 4/1982 | Jadwin | |
| RE31,072 E | 11/1982 | Jadwin et al. | |
| 4,385,823 A | 5/1983 | Kasper et al. | |
| 4,394,430 A | 7/1983 | Jadwin et al. | |
| 4,395,109 A | 7/1983 | Nakajima et al. | |
| 4,414,152 A | 11/1983 | Santilli et al. | |
| 4,416,965 A | 11/1983 | Sandhu et al. | |
| 4,473,029 A | 9/1984 | Fritz et al. | |
| 4,515,884 A | 5/1985 | Field et al. | |
| 4,546,060 A | 10/1985 | Miskinis et al. | |
| 4,624,907 A | 11/1986 | Niimura et al. | |
| 4,683,188 A | 7/1987 | Suzuki et al. | |
| 4,780,553 A | 10/1988 | Suzuki et al. | |
| 4,810,858 A | 3/1989 | Urban et al. | |
| 4,814,250 A | 3/1989 | Kwarta et al. | |
| 4,840,864 A | 6/1989 | Bugner et al. | |
| 4,843,920 A | 7/1989 | Hayasaki et al. | |
| 4,853,311 A | 8/1989 | Tavernier et al. | |
| 4,912,009 A | 3/1990 | Amering et al. | |
| 4,985,328 A | 1/1991 | Kumagai et al. | |
| 5,057,392 A | 10/1991 | McCabe et al. | |
| 5,066,558 A | 11/1991 | Hikake et al. | |
| 5,089,547 A | 2/1992 | McCabe et al. | |
| 5,102,765 A | 4/1992 | McCabe et al. | |
| 5,102,769 A | 4/1992 | Creatura | |
| 5,112,715 A | 5/1992 | DeMejo et al. | |
| 5,147,747 A | 9/1992 | Wilson et al. | |
| 5,219,694 A | 6/1993 | Anno et al. | |
| 5,230,978 A | 7/1993 | Kawasaki et al. | |
| 5,364,720 A | 11/1994 | Nakazawa et al. | |
| 5,376,492 A | 12/1994 | Stelter et al. | |
| 5,394,230 A | 2/1995 | Kaukeinen et al. | |
| 5,409,791 A | 4/1995 | Kaukeinen et al. | |
| 5,422,214 A | 6/1995 | Akiyama et al. | |
| 5,482,812 A | 1/1996 | Hopper et al. | |
| 5,489,975 A | 2/1996 | Kaukeinen et al. | |
| 5,500,320 A | 3/1996 | Saha | |
| 5,534,347 A | 7/1996 | Chen et al. | |
| 5,543,259 A | 8/1996 | Schwarz et al. | |
| 5,595,823 A | 1/1997 | Chen et al. | |
| 5,606,404 A | 2/1997 | Hilbert et al. | |
| 5,629,061 A | 5/1997 | Kass | |
| 5,707,772 A | 1/1998 | Akimoto et al. | |
| 5,709,975 A | 1/1998 | Yoerger et al. | |
| 5,744,274 A | 4/1998 | Wilson et al. | |
| 5,780,195 A | 7/1998 | Nava | |
| 5,840,457 A | 11/1998 | Urawa et al. | |
| 5,863,692 A | 1/1999 | Nakamura et al. | |
| 5,922,822 A | 7/1999 | Wilson et al. | |
| 5,985,499 A | 11/1999 | Guth et al. | |
| 5,990,332 A | 11/1999 | Sukata et al. | |
| 6,067,438 A | 5/2000 | Chen et al. | |
| 6,074,795 A | 6/2000 | Watanabe et al. | |
| 6,096,429 A | 8/2000 | Chen et al. | |
| 6,097,466 A | 8/2000 | Koma | |
| 6,103,439 A | 8/2000 | Ogawa et al. | |
| 6,221,550 B1 | 4/2001 | Wilson et al. | |
| 6,416,920 B1 | 7/2002 | Hopper et al. | |
| 6,692,880 B2 | 2/2004 | Fields et al. | |
| 7,314,696 B2 | 1/2008 | Fields et al. | |
| 8,147,948 B1 * | 4/2012 | Tyagi et al. | 428/206 |
| 2012/0100479 A1 * | 4/2012 | Aslam et al. | 430/124.1 |

FOREIGN PATENT DOCUMENTS

| | | |
|---|---|---|
| GB | 1 420 830 | 1/1976 |
| GB | 1 501 065 | 2/1978 |
| JP | 63-345551 | 2/1988 |
| JP | 63-155156 | 6/1988 |

OTHER PUBLICATIONS

Journal of Imaging Science and Tech., vol. 43, No. 3, May/Jun. 1999, pp. 288-294, "Effects of Silica Additive Concentration on Toner Adhesion, Cohesion, Transfer, and Image Quality", B. Gady, D. J. Quesnei, D. S. Rimai, S. Leone, and P. Alexandrovich.

Journal of Imaging Science and Tech., Tenth International Congress on Non-Impact Printing, 1994, pp. 156-159, "Characterization of Toner Adhesion to Carrier: A Phenomenological Model", James C. Maher.

Journal Am. Chem. Soc. vol. 60, pp. 309-319, Feb. 1938, "Adsorption of Gases in Multimolecular Layers", Stephen Brunauer, P.H. Emmett, and Edward Teller.

Journal of Imaging Science and Tech., vol. 48, No. 1, Jan./Feb. 2004, pp. 10-14, "Electrographic Printing on textiles and Non-Planer Substrates", D. S. Rimai and D J. Quesnel.

Journal of Imaging Science and Tech., vol. 45, No. 2, Mar./Apr. 2001, pp. 179-186, "Toner to Photoconductor Adhesion", D.S. Rimai, D. J. Quesnel, L. P. DeMejo, and M. T. Regan.

Journal of Imaging Science and Tech., vol. 46, No. 3, May/Jun. 2002, pp. 200-207, "Toner Adhesion: Effects of Electrostatic and van der Waals Interactions", D. S. Rimai, M. Ezenyllimba, W. K. Goebel, and S. Cormier.

* cited by examiner

LARGE PARTICLE TONER PRINTER

CROSS REFERENCE TO RELATED APPLICATIONS

This application relates to commonly assigned, copending U.S. application Ser. No. 12/911,978, filed Oct. 26, 2010, entitled: "LARGE PARTICLE TONER PRINTING METHOD"; U.S. application Ser. No. 12,912,017, filed Oct. 25, 2010, entitled: "LARGE PARTICLE TONER" and U.S. Pat. No. 8,147,948 issued Apr. 3, 2012, entitled: "PRINTER ARTICLE" each of which is hereby incorporated by reference.

FIELD OF THE INVENTION

The present invention relates to electrostatography, including electrography and electrophotography, and more particularly to photographic printing using large particle toners.

BACKGROUND OF THE INVENTION

In an electrophotographic engine, a primary imaging member (PIM) such as a photoreceptor is initially charged using known means such as a grid controlled corona charger or roller charger. An electrostatic latent image is then formed on the PIM by image-wise exposing the PIM using known means such as a laser scanner, an LED array, or an optical exposure. The electrostatic latent image is converted into a visible image, also referred to as a toner image by bringing the latent image bearing PIM into close proximity to a development station containing dry toner particles, also referred to as marking particles. The toner particles are electrostatically charged and the bias on the development station, relative to that in the image areas of the PIM is set so that a desired amount of toner is transferred from the development station to the PIM.

The toner image is then transferred from the PIM to a receiver such as paper by pressing the receiver into contact with the image-bearing PIM while exerting an electrostatic field so that the toner particles are urged to the receiver. The toner image can be transferred directly to the final receiver directly. Alternatively, the toner can be first transferred to a transfer intermediate member and then transferred from the transfer intermediate member to the final receiver. The toner image is then permanently fixed to the receiver by fusing the image, generally accomplished by subjecting the image-bearing receiver to a combination of heat and pressure sufficient to raise the toner to a temperature in excess of its glass transition temperature Tg and allowing the toner particles to flow into a cohesive mass. The PIM is cleaned after transfer to remove residual toner and other contaminants and made ready to produce another print.

To produce a color print electrostatic latent images are produced on a photoreceptor and then converted into color separation images corresponding to the subtractive primary colors, generally cyan, magenta, yellow, and black. These color separation images are transferred in register to a final receiver such as a sheet of paper. Transfer of the toner images can be done by either transferring to an intermediate transfer member and then from the intermediate transfer member to the final receiver or to the final receiver directly from the PIM. If a transfer intermediate member is employed, the separations can be transferred either in register to the intermediate transfer member or to separate transfer members and then transferred in register to the final receiver. Alternatively, the toner separations can be transferred to a single intermediate transfer member or to separate portions of the intermediate transfer member and then transferred, in register, to the final receiver.

In order to convert an electrostatic latent image into a visible image and then transfer the toner used to convert the electrostatic latent image into a visible image to a receiver, the toner particles must possess a carefully controlled electrostatic charge. This is accomplished by mixing toner particles with magnetic carrier particles to form a developer. The toner particles tribocharge against the carrier. To enhance and control tribocharging, the toner and carrier particles may comprise charge agents such as those known in the literature. The types and concentrations of the charge agents, in addition to the electronegativity properties of the toner and carrier, will result in a controlled, uniform charge being imparted on the toner. In addition, charge control can be further enhanced using particulate addenda on the surface of the toner particles.

The charge of the toner, expressed as the toner charge-to-mass ratio, can be determined using a method such as that described by J. C. Maher, Proc. IS&T's Tenth International Congress on Non-Impact Printing, IS&T, Springfield, Va. (1994), pp. 156-159. The apparatus consists of two parallel disk electrodes with a separation of 1.0 cm. The top electrode is connected to an electrometer. The bottom electrode is connected to a voltage source. A rotating segmented circular magnet is underneath the bottom electrode. Developer is placed on the bottom ring and a potential is applied between the electrodes as the segmented magnet is rotated. Motion of the developer due to the rotating magnet detaches toner from the magnetic carrier. The free toner is deposited on the upper electrode and the integrated charge associated with the deposited toner is measured by the electrometer. After a sufficient time (about 30 s) the upper disk is removed and passed under a magnet to remove stray carrier. The weight of toner on the disk is determined to obtain the charge-to-mass ratio.

Carrier particles typically comprise a magnetic material such as iron, ferrite, etc. The carrier particles can be either a soft or hard ferrite.

The size of the particulate addenda appended to the toner particles can be determined, for example, using the nitrogen absorption method of Brunauer, Emmett, and Teller (J. Am. Chem. Soc. 60, 309 (1938), commonly referred to as BET. A suitable instrument for determining the size of the particulate addenda is the Quantachrome Monosorb manufactured by Quantachrome Corporation.

Terms such as "toner diameter" and "carrier diameter" can refer to the median volume weighted diameters of the toner and carrier, as determined using a commercially available instrument such as a Coulter Multisizer. In years past, toner particles had diameters greater than 12 μm and often greater than 20 μm. However, for reasons that will be described presently it has proved difficult to generate to generate high resolution toner images using such large toner particles, accordingly, modern toner particles have diameters of approximately 6 μm to 8 μm.

In particular, it will be understood that larger toner particles are difficult to transfer causing toner images made with larger particles to have poor resolution and high granularity. One reason for this is that the Coulombic repulsion between large toner particles causes such larger toner particles to fly apart during transfer thus degrading image quality. This effect is known in the art as dot explosion. In addition, it will be appreciated that the amount of charge that can be formed on the PIM is limited according to material properties of the PIM and the amount of large particle toner that can be transferred to the PIM during development is therefore limited due to higher charge levels required to transfer such large diameter toner particles.

In contrast, small toner particles can be more controllably deposited onto the PIM and have higher resolution and lower granularity. In addition, the Coulombic repulsion tends to cause less scatter of the toner particles, reducing dot explosion. However, small diameter toner particles are more difficult to electrostatically transfer and, in fact, generally require the addition of small particulate addenda such as silica to enhance transfer.

Typically, developer comprises toner and carrier particles in a ratio of between approximately 2% and 12% by weight, depending on the size of the toner and carrier particles. The developer is loaded into a development station that contains an electrically bias able magnetic brush. The magnetic brush contains a core of magnets, generally alternating in polarity and a shell onto which the developer is brought into close proximity with the PIM so as to allow toner to come into contact with the PIM and convert the electrostatic latent image into a visible image. To bring fresh developer into the nip formed between the shell and the PIM, either the shell, the magnetic core, or both rotate. This rotation subjects the toner particles to centripetal accelerations such that, if the toner charge to mass ratio is too low, the toner will be thrown from the carrier and result in the formation of an undesirable powder cloud in a process known as dusting. The amount of toner deposited on the PIM depends on the difference of potential between the development station and the appropriate portion of the PIM, as well as the toner charge, with higher charged toner being deposited less than lower charged toner. However, if the charge on the toner particles is too low a condition known as dusting will result in which all portions of the PIM are being coated with toner. This would result in undesirable image background.

The term "mass of a toner particle" or mt refers to the mass of a spherical particle of the same material and having a radius equivalent to half of the toner diameter. Toner typically comprises a polymeric binder such as polyester (mass density ρ=1.2 g/cm3) polystyrene (mass density ρ=1.0 g/cm3), etc. The mass of a toner particle is calculated assuming a spherical particle of equivalent diameter. The mass of a toner particle is then $$m=4/3\pi R\char`^3\rho$$

where R is the radius of the toner particle and ρ is the mass density of the polymer binder. The charge on a toner particle q is the charge-to-mass ratio of the toner times the mass of a toner particle. It is apparent that centripetal acceleration varies as the cube of the toner particle radius.

As discussed, toner charge in a two component developer is generated by tribocharging the toner particles against the carrier. Accordingly, the charge on the toner depends on the surface area of the toner particle that is capable of contacting the carrier. While surface area can be accurately measured using BET, the amount of available surface area can be approximated using the surface of a spherical particle of equivalent radius, or $$A=4\pi R\char`^2.$$

The charge to mass of the toner would, accordingly, vary approximately as 1/R. Thus, large toner particles would have a higher charge than would smaller ones, but the charge to mass ratio of the larger toner particles would be smaller for a constant set of materials.

Another force that needs to be considered in transferring toner and maintaining dot stability are the van der Waals forces. These van der Waals forces give rise to the adhesion forces between the toner particles and any contacting substrate such as the PIM. They also give rise to cohesion between toner particles that stabilizes toner structures such as alphanumerics and half tone dots against disruption caused by Coulombic repulsion between particles. These forces are known to increase linearly with the toner radius, as discussed by Rimai et al. J. Imaging Sci. Technol. 47, 1 (2003).

It is often desired to produce a dry electrophotographic image with both small and large toner particles. For example, such a combination can be used to create image texture or relief, wherein the small toner particles are colored and serve as marking particles and the larger toner particles are clear and serve to allow texture to form. However, this is especially problematical. The presence of large toner particles can disrupt the formation of a toner image on the PIM due to its high charge and mass. In addition, with large toner particles, image disruption tends to be quite pronounced due to the Coulombic repulsion dominating over the van der Waals attraction. This can aggravate dot explosion. Moreover, the presence of large toner particles can impede the transfer of the small toner particles. Specifically, transfer is accomplished by applying an electrostatic transfer field E to urge the particles towards the receiver. However, the maximum applied field that can exist across an air gap, known as the Paschen discharge limit of air, varies inversely with the size of any air gap. Within a transfer nip formed by donor and receiver members, the gap is determined by image characteristics such as the toner diameter whereby the toner particles serve as tent poles that separate the two members.

Finally, transfer of small toner particles, i.e. toner particles having diameters less than 12 μm and generally between 2 μm and 8 μm is limited because the van der Waals forces are greater than the applied electrostatic forces. While the applied electrostatic force might be increased by increasing the toner charge, this would adversely affect the amount of toner that can be deposited in development. Moreover, the electrostatic image force between the toner and the primary imaging member increases as (q/R)2, making transfer more difficult. Finally, in transferring a color image, high charge on a previously transferred toner image would decrease the applied transfer field available to transfer a subsequent image.

As shown by Rimai et al. J. Imaging Sci. Technol. 47, 1 (2003), van der Waals forces can be decreased by appending small particulates to the surface of the toner and the use of such addenda is required to transfer small toner particles. However, as shown by Rushing et al. (J. Imaging Sci. Technol. 45,187 (2001)) and by Gady et al. (J. Imaging Sci. Technol. 43, 288 (1999) increasing particulate addenda increases dot explosion and decreases resolution. However, the use of such addenda is required to transfer small toner particles. For larger toner particles, those with diameters greater than 14 μm and even more so for toner particles having diameters greater than 20 μm the use of particulate addenda is generally not desired as the applied electrostatic forces dominate over van der Waals forces and the application of such addenda would decrease toner cohesion, thereby aggravating dot explosion.

At a minimum, challenges associated with transferring large toner particles limits the amount of large particle toner that can be transferred during a single pass and also causes a lack of coherency in the large particle toner that is transferred. These effects, in turn, limit the height of a toner stack that can be formed using large toner in a single toner transfer operation. However, it is desirable to be able to create toner stack heights in a single pass that are as high as is possible as this enables the creation of inverse mask toner patterns, structures having a distinct tactile feel, and other structural or aesthetic features that can be formed using relief patterns on the surface of a receiver without requiring multiple passes through the printer. Further, it is desirable to allow the creation of toner stack heights having improved packing densities of toner to provide more homogenous and more resilient toner structures.

It is clear that, to form an image that combines of small and large toner particles, new processes and materials are needed.

SUMMARY OF THE INVENTION

Printers are provided for printing using large particle toner. In one aspect a printer has a printer controller causing a first imaging module to form first toner image using a first toner particle having a first charge-to-mass ratio and a median volume weighted diameter between 3 um and 9 um and having a first charge-to-mass ratio and, a second imaging module to form a second toner image using second toner particles having a median volume weighted diameter that is greater than 20 um and a charge-to-mass ratio that is between ⅓ to ½ of the first charge to mass ratio of the first toner times the ratio of the median volume weighted diameter of the first toner to the median volume weighted diameter of the second toner. The controller further causes first toner image to be transferred to a receiver using a first electrostatic field and the second toner image to be transferred to the receiver using a second electrostatic field.

DETAILED DESCRIPTION OF THE INVENTION

The present description will be directed in particular to elements forming part of, or in cooperation more directly with the apparatus in accordance with the present invention. It is to be understood that elements not specifically shown or described may take various forms well known to those skilled in the art.

General Operation of Printer

Figure 1:
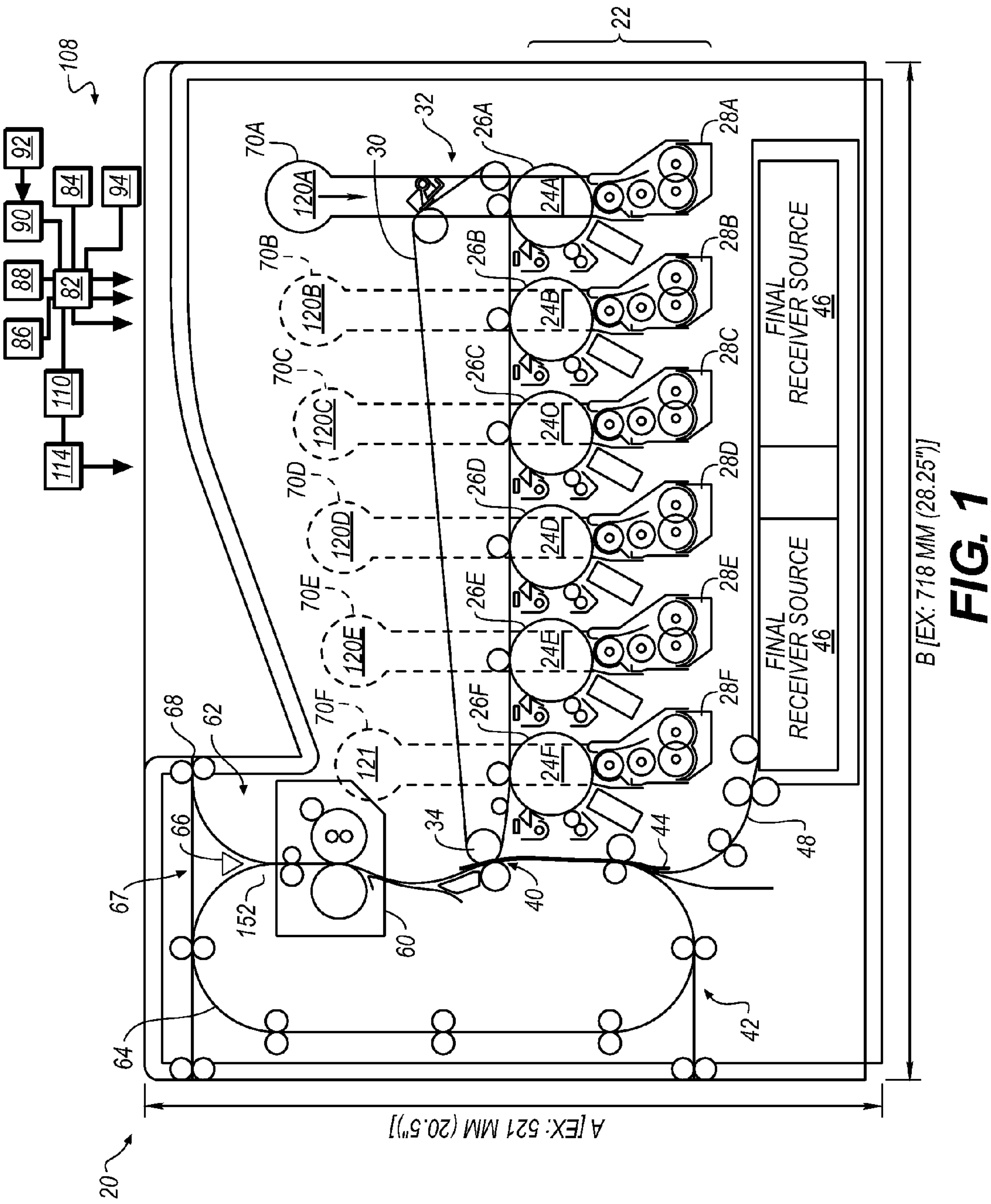
FIG. 1 is a schematic view of one embodiment of an electrophotographic printer.

FIG. 1 shows an electrophotographic (EP) printer 20 having a print engine 22 for recording toner images on an intermediate transfer member (ITM) 30 and an intermediate transport system 32 with at least one intermediate transport motor 34 for moving intermediate transfer member 30 past print engine 22 and to a transfer nip 40. Print engine 22 forms a multi-toner image on ITM 30 by sequentially transferring single toner images in registration on ITM 30 as ITM 30 is moved past print engine 22. A receiver transport system 42 moves a final receiver 44 along a receiver path 48 from a receiver source 46 through transfer nip 40 so the multi-toner image is transferred from ITM 30 to final receiver 44. Receiver transport system 42 then moves final receiver 44 and the transferred multi-toner image through a fuser 60 to fuse, fix or sinter the transferred multi-toner image to final receiver 44.

EP Printer 20 is controlled by a printer controller 82 which can take the form of a microprocessor, microcontroller or other such device which controls EP printer 20 based on signals from a user input system 84, appropriate sensors 86 of conventional design and an optional data communication system 90 which can comprise any type of electronic system that can receive information that can be used during printing operations by printer controller 82 and optionally that can send any signals required to obtain such information from external devices 92. EP Printer 20 uses actuators and other circuits and systems 88 that enable printer controller 82 to exert physical control over particular operations.

EP printer 20 is shown having dimensions of A×B which are around in one example, 521×718 mm or less, however, it will be appreciated that such dimensions are exemplary and are not limiting.

As is shown in the embodiment of FIG. 1, print engine 22 has a plurality of electrophotographic modules 24A, 24B, 24C, 24D, 24E, and 24F that are provided in tandem and that transfer the various layers of toner necessary to form the multi-toner image. In this embodiment each electrophotographic module 24A, 24B, 24C, 24D, 24E, and 24F has, respectively, a primary imaging member 26A, 26B, 26C, 26D, 26E, and 26F, and a development station 28A, 28B, 28C, 28D, 28E, and 28F that mixes toner from toner supplies 70A, 70B, 70C, 70D, 70E, and 70F with a magnetic carrier to form a charged developer for developing latent electrostatic images on transfer primary imaging members 26A, 26B, 26C, 26D, 26E, and 26F. This process will be described in greater detail below.

As is discussed above, conventional toner 120 takes the form of toner particles of a size that is between 2 um and 9 um and is formed from a material or mixture of materials that can be charged and electrostatically attracted from a development station 28A-28F to a primary imaging member 26A-26F to form an image, pattern, or coating on an appropriately charged primary imaging member including a photoreceptor, photoconductor, electrostatically-charged, magnetic or other known type of primary imaging surface. Method and systems for imparting the charge pattern are well known to those of skill in the art. Toner is used in an electrophotographic print engine 22 to convert an electrostatic latent image into a toner image on primary imaging members 26A-26F respectively.

Conventional toner particles 120 typically include color toner particles that have optical densities such that a monolayer coverage (i.e. sufficient application of marking particles such that a microscopic examination would reveal a layer of marking particles covering between 60% and 100% of a primary imaging member) would have a transmission density of between 0.6 and 1.0 in the primarily absorbed light color (as measured using a device such as an X-Rite Densitometer with Status A filters). However, it will be appreciated that these transmission densities are exemplary only and that any conventional range for transmission density or reflectivity can be used with the color toner particles.

Toner can also include clear particles that have the appearance of being transparent or that while being generally transparent impart a coloration or opacity. Such clear toner can provide for example a protective layer on an image and, optionally, on unprinted portions of final receiver 44 or can be used to create other effects and properties.

The various electrophotographic modules 24A-24F form toner images using one type of toner and they can be used in various combinations as desired to print different types of images or to achieve other effects. In the embodiment of print engine 22 shown in FIG. 1 six electrophotographic modules 24A, 24B, 24C, 24D, 24E and 24F enable six different toner images to be applied to ITM 30 enabling, for example, six different types of toner to be applied in various combinations.

For example, in one application, modules 24A, 24B, 24C, 24D supply conventional toners 120A, 120B, 120C, and 120D of one of the subtractive primary colors. These primary subtractive colors can be applied in various combinations to create images having a full gamut of colors. This allows fifth and sixth electrophotographic modules 24E and 24F to be used to deliver additional toner types. These additional toner types can include, but are not limited to conventional toner types that include other toner colors, clear toner, raised print, MICR magnetic characters, as well as specialty colors and metallic toners. In one example, fifth electrophotographic module 24E can deliver a conventional toner 120E that has a particularly desirable or esoteric color that, for example, can be closely but not exactly matched using toners with the basic four subtractive color marking particles. In this example, sixth electrophotographic module 24F can be used to provide a large particle toner 121 as will be described in greater detail below. Here too, it will be understood that these examples are not limiting as fifth electrophotographic module 24E and sixth electrophotographic module 24F can deliver any known type of toner as may be useful or required and as any of electrophotographic modules 24A-24F can be used to form toner images having large particle toner.

In one example, user input system 84 can sense a selection that is made by an individual operating or owning (hereafter referred to as the operator) an EP printer 20 and can provide control signals to printer controller 82 that printer controller 82 can use to determine whether to apply specialty toner particles to a multi-toner image and where to apply these specially toner particles in order to achieve a particular print outcome. Similarly, printer controller 82 can determine which specialty toner to apply to an image and where to apply such specialty toner based upon analysis of the image data or print instructions associated with an image to be printed.

It will be appreciated that the organization of toner types with respect to particular electrophotographic modules 24A-24F shown in FIG. 1 is provided by way of example and is not limiting.

In the embodiment that is illustrated in FIG. 1, each toner image is transferred, in register, from one of the primary imaging members 24A-24F to ITM 30 to form a multi-toner image. Methods and systems for imparting the charge pattern are well known to those of skill in the art. ITM 30 can be in the form of a continuous web as shown or can take other forms such as a drum or sheet. It is preferable to use a compliant intermediate transfer member, such as described in the literature, but ITM 30 can also take a non-compliant form.

The multi-toner image formed on ITM 30 is transferred to a final receiver 44 when final receiver 44 passes through transfer nip 40 in registration with a portion of ITM 30 having the multi-toner image. In the embodiment that is illustrated in FIG. 1, final receiver 44 is provided in the form of receiver sheets that are held in EP printer 20 at receiver source 46. However, in other embodiments, final receiver 44 can be provided on rolls or in other forms that can be supplied form receiver source 46.

Final receiver 44 enters a receiver path 48 from receiver source 46 and travels initially in a counterclockwise direction through receiver path 48. Alternatively, final receiver 44 could also be manually input from the left side of the electrophotographic printer 20. The multi-toner image is transferred from ITM 30 to final receiver 44 and multi-toner image bearing final receiver 44 then passes through a fuser 60 where multi-toner image is fixed to final receiver 44.

Final receiver 44 then enters a region where final receiver 44 either enters an inverter 62 or continues to travel counterclockwise through a recirculation path 64 that returns final receiver 44 to receiver path 48 such that final receiver 44 will pass through transfer nip 40 and fuser 60 again.

A return area 67 is provided that allows final receiver 44 to first enter inverter 62 before being moved through return area 67 to reenter recirculation path 64 so that final receiver 44 travels clockwise, stops, and then travels counterclockwise back through recirculation path 64 to receiver path 48. This inverts final receiver 44, thereby allowing an image to be formed on both sides of final receiver 44 to provide a duplex print. Prior to inverter 62 is a diverter 66 that can divert final receiver 44 from inverter 62 and send final receiver 44 along recirculation path 64 in a counterclockwise direction.

Recirculation of a non-inverted final receiver 44 allows multiple passes on a same side of final receiver 44 as might be desired if multiple layers of marking particles are used in the image or if special effects such as raised letter printing using large clear toner are to be used. Operation of diverter 66 to enable a repeat of simplex and duplex printing can be visualized using the recirculation path 64.

It should be noted that, if desired, fuser 60 can be disabled so as to allow a simplex image to pass through fuser 60 without fusing. This might be the case if an expanded color balance in simple printing is desired and a first fusing step might compromise color blending during the second pass through the EP engine. Alternatively, a fuser 60 that tacks or sinters, rather than fully fuses an image and is known in the literature can be used if desired, such as when multiple simplex images are to be produced.

Optionally, an image bearing final receiver 44 can also be processed by a post-fusing glosser (not shown) that imparts a high gloss to the image, as is known in the art.

Development Station

Figure 2:
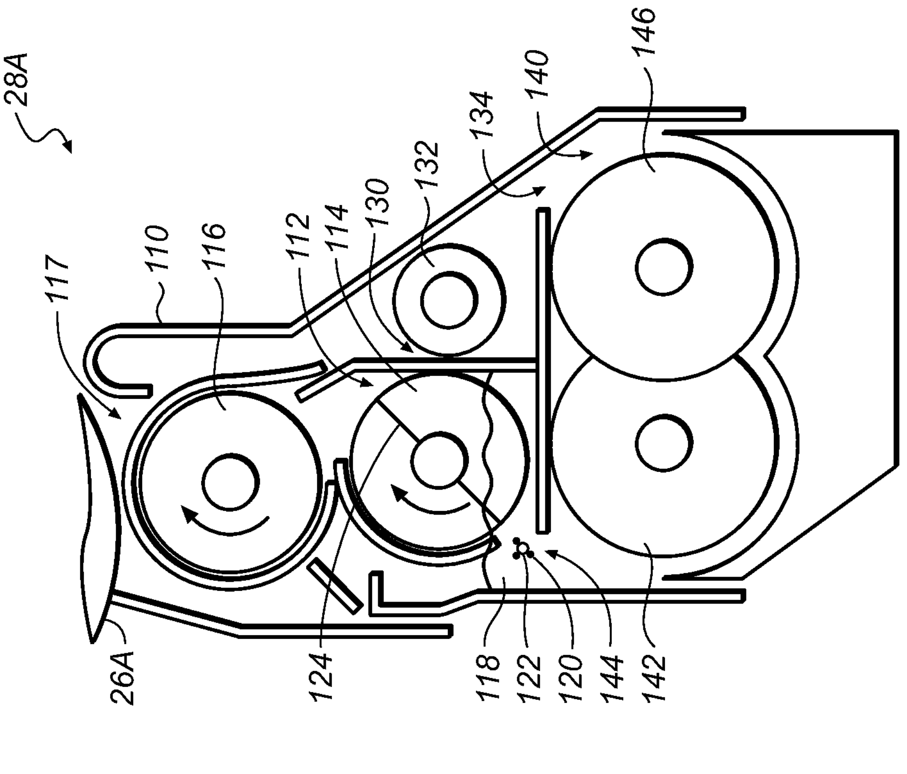
FIG. 2 is a transverse cross-sectional view of a development station for an electrophotographic printer.
Figure 3A:
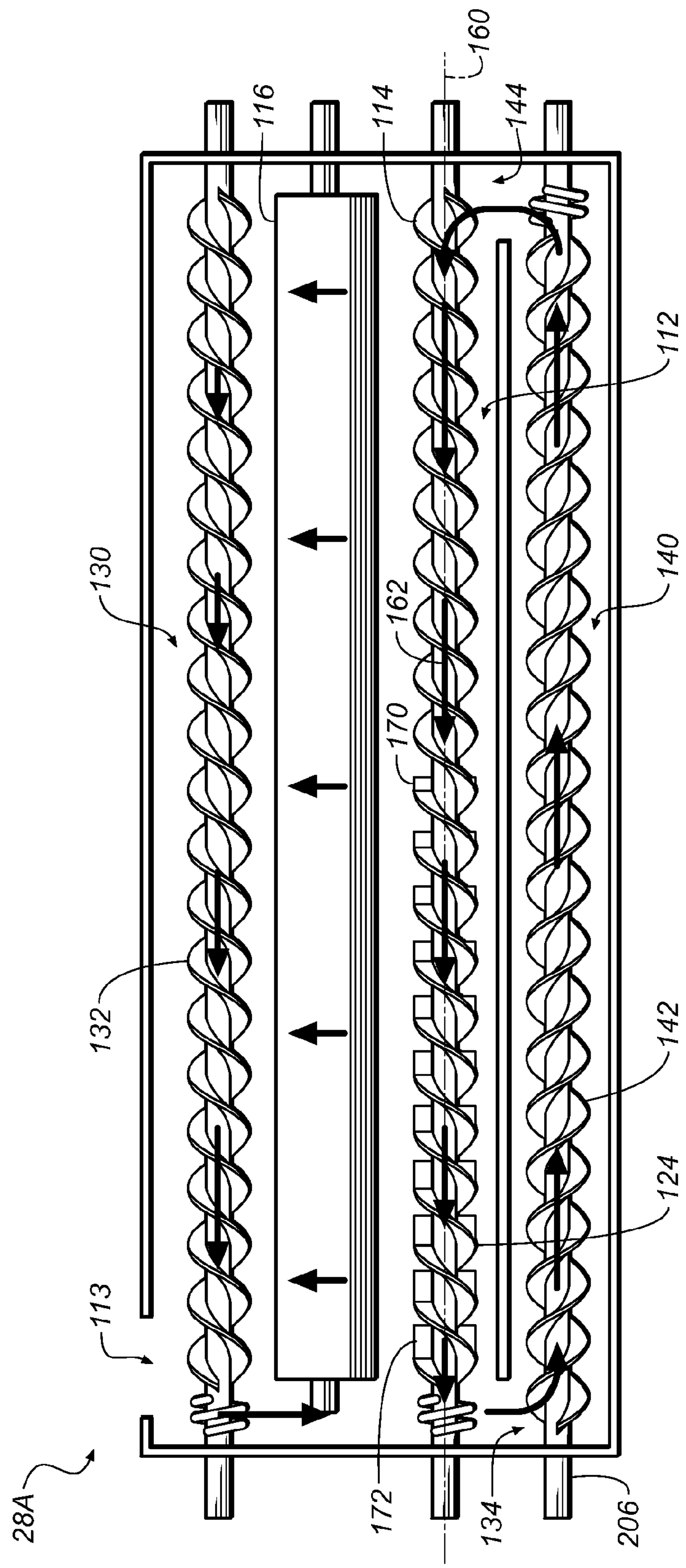
FIG. 3A is a longitudinal cross-sectional schematic view of one embodiment of the development station of FIG. 2 illustrating developer flow.
Figure 3B:
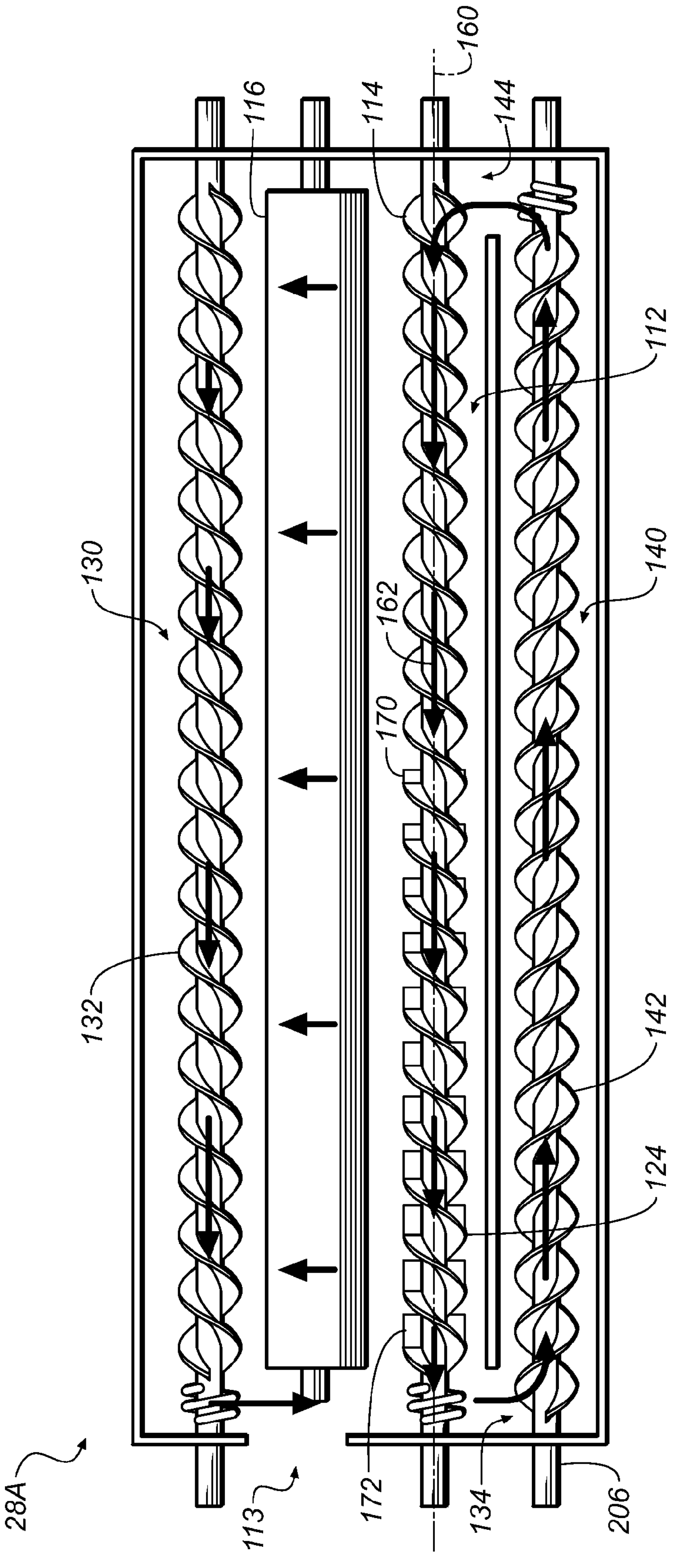
FIG. 3B is a longitudinal cross-sectional schematic view of another embodiment of the development station of FIG. 2 illustrating developer flow.
Figure 3C:
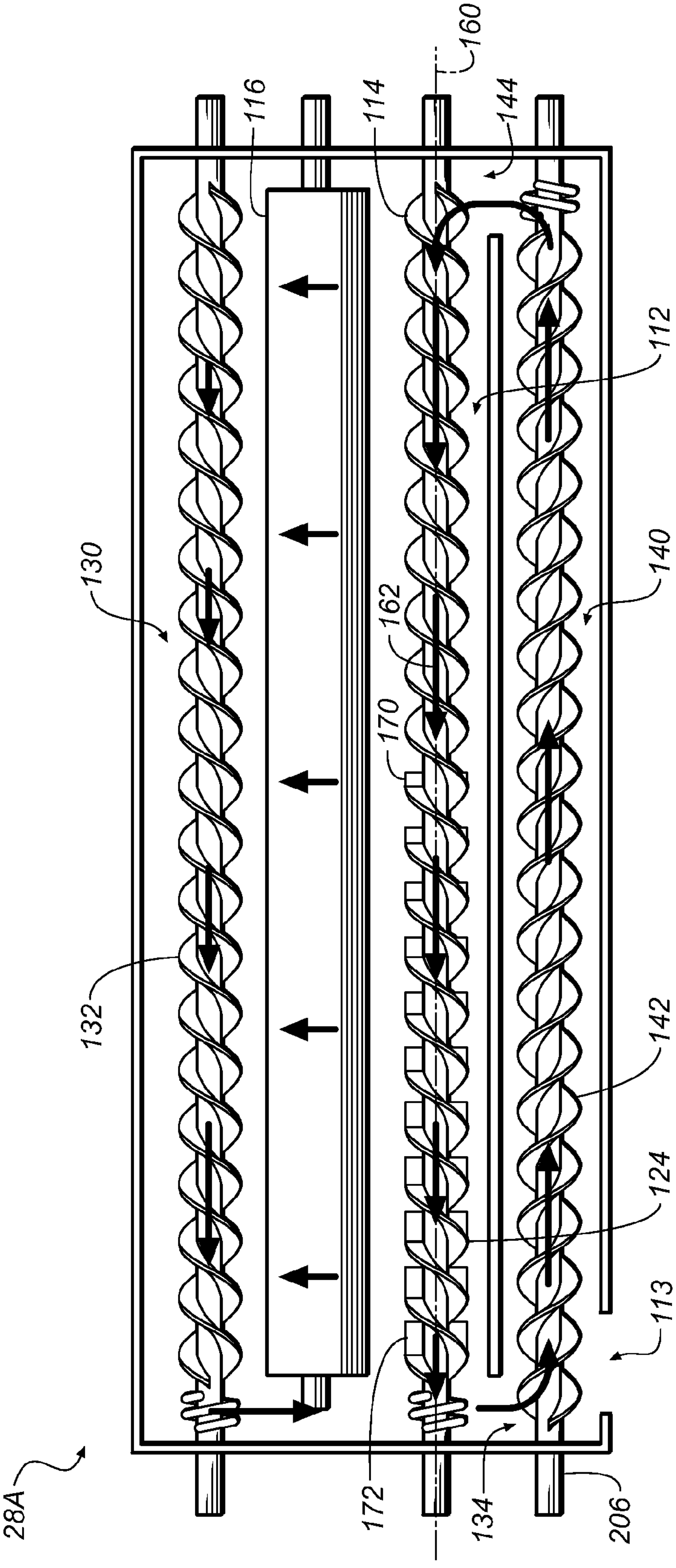
FIG. 3C is a longitudinal cross-sectional schematic view of another embodiment of the development station of FIG. 2 illustrating developer flow.

FIGS. 2 and 3A-3C provide a first detailed example embodiment of a development station 28A. FIG. 2 is a transverse cross-sectional view of development station 28A, while FIGS. 3A-3C present longitudinal cross-sectional schematic view of one embodiment of development station 28A of FIG. 2 showing the directional flow of toner in development station 28A.

As is commonly understood in electrophotographic printers, development stations 28A-28F are used to create a supply of charged toner particles that can be exposed to an electrostatic field on a primary imaging member (PIM) 26A such that toner can be attracted to PIM 26A according to the intensity and pattern of the electrostatic image formed on PIM 26A. Charge is typically applied to such toner particles by a tribocharging process in which toner particles are mixed with other particles in a manner that imparts a charge on the toner particles.

In this embodiment, development stations 28A-28F process two component developers such as those containing both toner particles and magnetic carrier particles. Accordingly, development stations 28A-28F are of the type that can deliver two component developer using a rotating magnetic core, a rotating shell around a fixed magnetic core, or a rotating magnetic core, a rotating magnetic shell or a development roller 116 to expose the toner and magnetic carrier to the image wise charged PIM 26A-26F associated therewith. During this exposure, toner is drawn from the toner/carrier mix and onto the PIM 26A and subsequently transferred to ITM 30. This toner must replaced at least to an extent necessary to provide a range of toner concentration in the mix that does not detract from the density or apparent density of the toner image that is formed on ITM 30.

It is therefore a function of development stations 28A-28F to replenish the toner in developer 118 after use to an extent that is sufficient to prevent depletion artifacts from forming in an image and to maintain the density of the image. Replacement toner particles are added to the development stations 28A-28F by replenishment stations 70A-70F, each of which contains a toner type of the toner being used in development stations 28A-28F, respectively.

As is shown in FIG. 2, development station 28A comprises a housing 110 having a first channel 112 with a feed auger 114. A development roller 116 is adjacent feed auger 114 and is also adjacent a development window 117. The cross-sectional view of FIG. 2 shows a low volume of developer 118 containing magnetic particles and toner particles 120 (not to scale) in first channel 112. In FIG. 2, toner particles 120 are represented schematically as a filled-in circles and magnetic particles 122 as an unfilled circle. As is shown in the embodiment of FIG. 2, feed auger 114 optionally incorporates two of a plurality of paddles 124 to facilitate developer movement as will be described in general in greater detail below.

In operation, developer 118 is fed from first channel 112 to development roller 116. Development roller 116 moves developer 118 to exposure window 117 where developer 118 is positioned in proximity with primary imaging member 26A. A portion of toner 120 in developer 118 exposed to development roller 116 is transferred onto primary imaging member 26A as a product of electrostatic attraction caused by electrostatic patterns applied to primary imaging member 26A by a writer (not shown) of conventional design. After exposure, the developer is moved by developer roller 116 away from exposure window 117 and drops into second channel 130. A return auger 132 is in second channel 130 to collect any developer 118 that enters second channel 130 and to direct developer 118 to an opening 134 at the rear of housing 110 where developer 118 collected by second channel 130 is dropped into third channel 140. At least one mixing auger 142 is provided in third channel 140 to move developer 118 to a passageway 144 at the front of housing 110, where this developer 118 is fed to feed auger 114 in first channel 112. As is illustrated here, third auger 142 is optionally assisted by a second mixing auger 146.

FIG. 3A is a longitudinal cross-sectional schematic view of one embodiment of the development station 28A of FIG. 2 illustrating developer flow in development station 28A. As is shown in FIG. 3A, there is a decreasing volume of developer in first channel 112 along an axis 160 of feed auger 114. In FIG. 3 this is indicated by the decreasing length of the arrows 162 in the direction of developer flow indicated by the arrow direction. Uniform flow of developer over development roller 116 is indicated by similar arrows of the same size. Increasing volume of developer in second channel 130 is indicated by the increasing length of the arrows in the direction of developer flow. The arrows also indicate that developer from first channel 112 and second channel 130 is collected in the third channel 140, where this developer is mixed with additional toner from toner source 70A (as shown in FIG. 1) and fed from an opening 113. As is shown in FIG. 3A, opening 113 provides additional toner to replenish toner concentrations in developer that has been exposed at exposure window 117 as this developer is going into the downstream end of the return auger. This allows the additional toner to be added to the depleted developer as the depleted developer is being combined with the surplus developer from feed auger 114 at the downstream end of feed auger 114 and allowing the combination to fall into the upstream end of the mixing auger 142, which in this embodiment is proximate to first end 206 of mixing auger 142.

FIG. 3B shows another embodiment of a development station 28A with opening 113 located where the surplus developer from feed auger 114 and the depleted developer from the return auger are combined and transferred to an upstream end of mixing auger 142 which in this embodiment is proximate to first end 206 of mixing auger 142.

FIG. 3C shows the replenishment toner opening 113 arranged to supply additional toner proximate upstream end of the mixing auger 142, which in this embodiment is proximate to first end 206 of mixing auger 142. Here, the additional toner is added to the depleted developer and surplus developer so that all three would have the entire length of the mixing auger to be mixed and agitated.

Each of these embodiments creates an opportunity for a full length of mixing provided by mixing auger 142 to be used to deliver developer that has a relatively homogeneous toner concentration and the toner charge level before the developer is transferred to the feed auger and onto the development roller. Opening 113 can alternatively be positioned to use less of the available length of a mixing auger 142 so long as the development station 28*a* provides developer at exposure window 117 having a desired range of toner concentration and toner charge levels.

Large Particle Toner

As is noted above, toner particles can have a range of diameters, and for the technical reasons identified above the standard for toner particle size is between 2 um and 9 um. For convenience, the terms toner size or diameter are defined in terms of the median volume weighted diameter as measured by conventional diameter measuring devices such as a Coulter Multisizer, sold by Coulter, Inc. The volume weighted diameter is the sum of the mass of each toner particle multiplied by the diameter of a spherical particle of equal mass and density, divided by the total particle mass. Toner is also referred to in the art as marking particles or dry ink. In certain embodiments, toner can also comprise particles that are entrained in a wet carrier.

However, there are many purposes for which a large particle toner 121 having toner particle sizes on the order of greater than about 20 um or larger is beneficial. In particular, such large particle toners allow larger toner stacks to be created to allow the formation of relief patterns on a substrate. Such relief patterns can be used for any number of structural or aesthetic purposes, including but not limited to providing areas with distinct tactile feel on an image, providing containment structures for example for fluids, forming structural elements and forming optical elements.

Of particular interest is the ability to generate relief patterns in a way that achieves maximal applied height in a single pass through a printing module. This requires the use of large particle toner 121 including particles of least one toner resin having median volume weighted particle diameters greater than about 20 microns.

However the use of large particle toner 121 involves solving the problems that are identified above. To help address these problems, various embodiments of a large particle toner 121 are disclosed herein that can be printed using novel printing methods and printers to create printed articles having novel features without creating the difficulties that have helped to drive toner sizes to smaller particles.

One example embodiment of a large particle toner is a toner 121 having toner particles of a toner resin with particles that have a volume weighted average diameter of greater than about 20 microns, a first particulate addenda having a BET surface area of less than 60 m2/g of the toner particle and a second particulate addenda having a BET surface area of more than 120 m2/g.

The toner resin can be for example, and without limitation a polyester resin or a cross-linked styrene acrylate copolymer or any other conventionally known toner resins.

The first particulate addenda provides a charge control agent. The term “charge-control” refers to a propensity of the first particulate addenda to modify the triboelectric charging properties of the resulting toner. Examples of materials having such charge properties and that can be used for such first particulate addenda include but are not limited to titania, alumina or zinc oxide.

A very wide variety of materials are known that can be used for the first control agent to provide the charge control agent for positive and negative charging toners are available and can be used. Additional materials that can be used for this purpose are disclosed for example, in U.S. Pat. Nos. 3,893,935; 4,079,014; 4,323,634; 4,394,430; and British Patent Nos. 1,501,065 and 1,420,839, all of which are incorporated in their entireties by reference herein. Additional charge control agents which can be used for this purpose are described in U.S. Pat. Nos. 4,624,907; 4,814,250; 4,840,864; 4,843,920; 4,683,188; and 4,780,553, all of which are incorporated in their entireties by reference herein.

The surface treatment with a surface treatment agent or a spacing agent preferably reduces the attraction between the toner particles and magnetic carrier particles, such as the hard magnetic carrier particles to a degree sufficient that the toner particles are transported by the carrier particles to the development zone where the electrostatic image is present and then the toner particles leave the carrier particles due at least in part to the sufficient electrostatic forces associated with the charged image. Accordingly, the preferred toner particles of the present invention permit attraction with the magnetic carrier particles but further permit the stripping of the toner particles from the hard magnetic carrier particles by the electrostatic and/or mechanical forces and with surface treatment on the toner particles. In other words, the spacing agent on the surface of the toner particles, as indicated above, is sufficient to reduce the attraction between the toner particles and the hard magnetic carrier particles such that the toner particles can be stripped from the carrier particles by the electrostatic forces associated with the charged image or by mechanical forces.

The second particulate addenda, is used as a spacing agent and in certain embodiments, the preferred spacing agent is silica, such as those commercially available from Degussa, like R-972, or from Wacker, like H2000.

Other suitable spacing agents include, but are not limited to, other inorganic oxide particles and the like. Specific examples include, but are not limited to, titania, alumina, zirconia, and other metal oxides; and also polymer beads preferably less than 1 um in diameter (more preferably about 0.1 .mu.m), such as acrylic polymers, silicone-based polymers, styrenic polymers, fluoropolymers, copolymers thereof, and mixtures thereof.

The amount of the second particulate addenda on the toner particles is an amount sufficient to permit the toner particles to be stripped from the magnetic carrier particles by the electrostatic forces associated with the charged image. However, as will be noted below, for toner particles having sizes on the order of 20 um, the amount of spacing agent must be carefully controlled because the centrifugal forces acting on a toner particle during development, for example, are significantly higher than those acting on a toner particle that is on the order of 3 um to 9 um. Thus, a more careful balance of the requirements of separation and adhesion is required. For toner particles that have volume weighted diameters in of about 20 um or greater, the amounts of the second particulate addenda are from about 0.3 to about 1.1 weight percent of silica of the toner.

The second particulate addenda can be applied onto the surfaces of toner particles by conventional surface treatment techniques such as, but not limited to, conventional mixing techniques, such as tumbling the toner particles in the presence of the spacing agent. Preferably, the second particulate addenda is distributed on the surface of the toner particles. The second particulate addenda is attached onto the surface of the toner particles and can be attached by electrostatic forces or physical means or both. With mixing, preferably uniform mixing is preferred and achieved by such mixers as a high energy Henschel-type mixer which is sufficient to keep the second particulate addenda from agglomerating or at least minimizes agglomeration. Furthermore, when the second particulate addenda is mixed with the magnetic toner particles in order to achieve distribution on the surface of the toner particles, the mixture can be sieved to remove any agglomerated spacing agent. Other means to separate agglomerated particles can also be used for these purposes.

The first and the second addenda can be charged and have different polarities to reduce the net charge effects of the addenda and/or to create beneficial charge effects.

Methods for Printing Using Large Particle Toner

Figure 4:
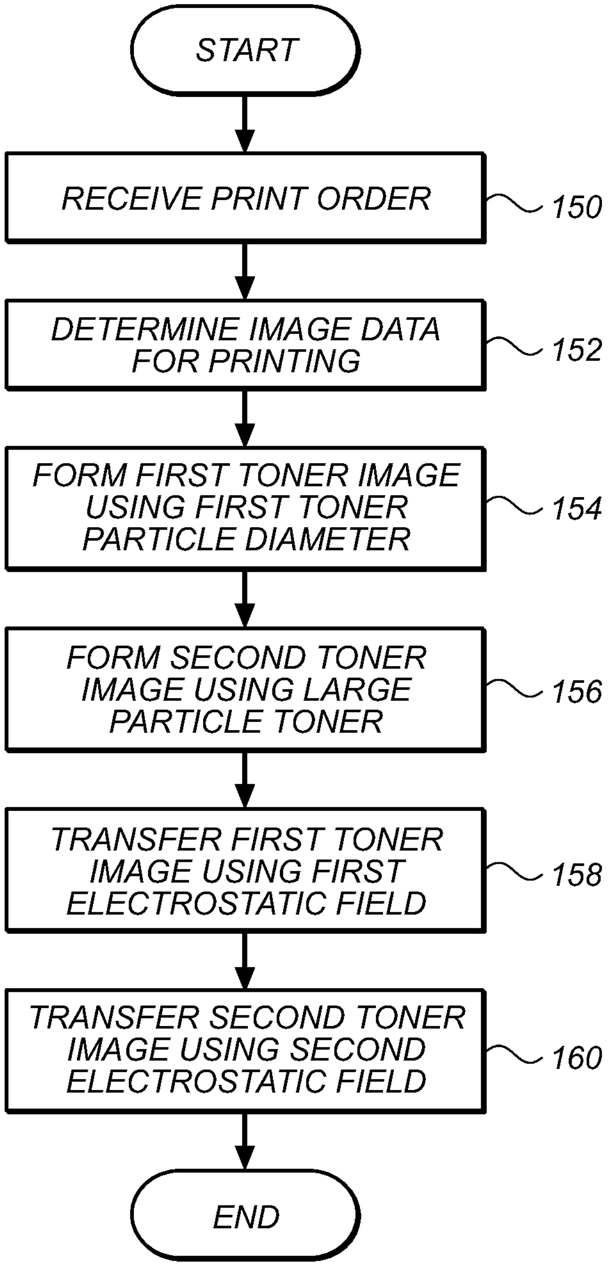
FIG. 4 shows one example embodiment of a method for printing using large particle toner.

FIG. 4 shows a flow chart depicting first method for printing an image using large particle toner 121. As is shown in the embodiment of FIG. 4, a print order is received including information from which an image to be printed can be determined (step 150). The print order can be received by source of image data 108 (FIG. 1). In the embodiment illustrated in FIG. 1, source of image data 108 can comprise any or all of printer controller 82, user input system 84, or memory 88 from communication system 90. The print order can take any known form. The print order includes at least some data from which printer controller 82 can determine image data for printing and can optionally include production data from which the manner in which the image data is to be printed can be determined. The production data can also optionally include finishing data that defines how the printed image is to be processed after printing.

The print order information is typically generated external to printer 20. In one example, an external device 92 can comprise what is known in the art as a digital front end (DFE), which is a computing device that can be used to provide an external source of print order information, including image data. Print order information that is generated by such an external device 92 is received at communication system 90 which in turn provides the print order information to printer controller 82.

Similarly, the print order or portions thereof including image data and production data can be determined from data in any other source that can provide such data to printer 20 in any other manner, including but not limited receiving print order information from a portable memory solution that is connected to memory 88.

In certain embodiments image data and/or production data or certain aspects thereof can be generated by printer 20 such as by use of user input system 84 and an output system 94. In one embodiment of this type digital image mastering and/or editing software can be executed by printer controller 82 at printer 20. In other embodiments of this type, a digital front end or portions thereof can be incorporated into printer 20. Input system 84 and output system 94 can also be used to make local edits or modifications to the image data such as may be necessary or useful in customizing the image data for printing using printer 20.

Printer controller 82 uses the information in the print order information to determine the image data for printing (step 152). In general, the determined image data includes the entirety of what is to be printed on a final receiver 44 by printer 20 and can comprise any pattern that can be provided by delivering one or more applications of conventional toner 120 or large particle toner 121 to a final receiver 44. In this regard, the print order information can generally comprise any type of data or instructions that printer controller 82 can use to locate, obtain, calculate or otherwise provide or make available image data for an image to be printed. For example, and without limitation, the print order can include the image data for printing and this image data can be used for printing. In another example, the print order information can include instructions or data that will allow printer controller 82 and communication system 90 to obtain an image data file from external devices 92.

A first toner image is then formed based on the image data using a first toner of a conventional type of toner 120 having first toner particles with a median volume weighted diameter between about 3 um and 9 um and having a first charge-to-mass ratio (step 154). The first charge-to-mass ratio can be in a conventional range as is known in the art for conventional toner 120. In this regard, printer controller 82 will cause a developer station 28 such as first development station 28A and a first printing module 28A to operate in a conventional fashion, to develop the first toner image on first PIM 26A.

A second toner image is then formed based on the image data using the large particle toner 121 (step 156). Here printer controller 82 causes a second development station such as, for example, sixth development station 28F to operate to mix large particle toner 121 and a carrier to create a charge-to-mass ratio in the particles of the large particle toner 121 that is between ⅓ to ½ of the first charge-to-mass ratio times the ratio of the median volume weighted diameter of toner 120 to the median volume weighted diameter of large particle toner 121. Printer controller 82 then causes the charged large particle toner 121 to be exposed to a second electrostatic field provided by the difference of potential between the surface of primary imaging member 26F of a sixth print module 28F.

This second electrostatic field causes large particle toner 121 to transfer across a gap formed between the development roller 116 of a sixth development station 28F and a sixth primary imaging member 26F.

The first toner image is then transferred to a receiver using a first electrostatic field (step 158). This can be done using electrostatic forces in accordance with conventional transfer techniques for transferring toner onto a receiver which can include intermediate transfer member 30 or a final receiver 44.

The second toner image is transferred to a receiver which can be the same receiver onto which the first toner image was transferred and can comprise for example, an intermediate transfer member 30 or a final receiver 44. A second electrostatic field is used to cause the second toner image to transfer (step 160). This transfer process is typically done by pressing the receiver into contact with the image bearing surface while exerting an electrostatic field to urge the toner from the surface to the receiver. In the case where the receiver of the second toner image is an intermediate transfer member such as ITM 30, transfer can either be done in register with the first image or distinct from the first image. In this case, the second toner image is subsequently transferred from ITM 30 to a final receiver 44 such as a paper in register by pressing final receiver 44 into contact with the ITM 30 while exerting a third electrostatic field to urge second toner image to transfer to the final receiver 44.

It will be understood that use of large toner particle toner 121 can cause the air gap between a primary imaging member and a receiver to be larger than the air gap would be when developing using smaller toner particles. The larger air gap, in turn, results in a lower Paschen discharge limit. The reduced Paschen discharge limit, in turn, reduces the available electrostatic field strength that can be applied across the gap, in turn reducing the force that can be exerted on the large particle toner 121 during transfer by an applied electrostatic field. By reducing the electrostatic and van der Waals forces acting on large toner particles of the large particle toner 121 through the use of the first particulate addenda and the second particulate addenda, desirable transfer volumes of large toner particles can be achieved across the larger air gap required by the larger toner particles despite the reduced electrostatic field available for transfer.

Figure 5:
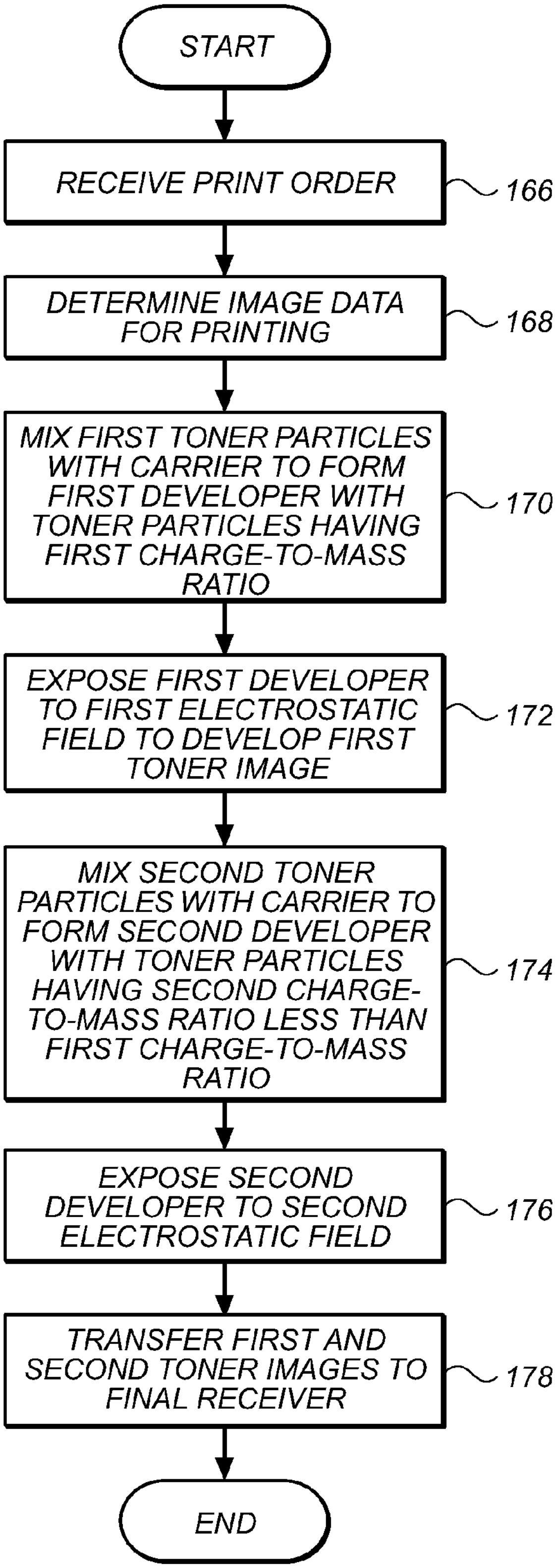
FIG. 5 shows another example embodiment of a method for printing using large particle toner.

FIG. 5 shows another embodiment of a method for printing images including large particle toner 121. In the embodiment of FIG. 5, a print order is received (step 166) and image data for printing is then determined (step 168). These steps can be performed as is described above with respect to steps 150 and 152. A first toner is mixed with carrier to form a first developer (step 170) such that the first developer has a determined ratio of toner and carrier and toner particles in the developer are charged to have a first charge-to-mass ratio. The first developer is exposed to a first electrostatic field caused by a first difference in potential so as to urge the toner to move across a first transfer distance to develop a first toner image (step 172). The first toner has particle sizes that are between 3 um and 9 um and, accordingly, printer controller 82 can cause these steps to be performed in a conventional manner.

Second toner is mixed with carrier to form a second developer. The second developer has a determined ratio of second toner particles and carrier and has a second toner particles that are charged to have a second charge-to-mass ratio (step 174). Here printer controller 82 can adjust the mixing process as required to create the desired second charge-to-mass ratio, such as by adjusting the rate of mixing or extent of mixing that occurs in the development station used to develop the second developer. The second developer is exposed to a second electrostatic field caused by a second difference in potential so as to urge the second toner to transfer across a second transfer distance to form a second toner image (step 176). The image content for the first toner image and second toner image can be determined based upon the image data for printing. The first toner image and the second toner image are then transferred to a final receiver 44, typically in registration (step 178). Such transfer can be performed in the manner described in the previous embodiment.

In this embodiment the second toner particles are of the large particle toner 121 and have a median volume weighted diameter of greater than 20 um, while the first toner particles have a median volume weighted diameter between about 3 um to 9 um. Because the large toner particle toner 121 has a first particulate addenda and a second particulate addenda as described above to provide a charge control agent and a separator addenda both electrostatic and van der Waals forces are controlled to allow development using large toner particles while having a lower charge to mass ratio than the first toner particles and with the second electrostatic field being less than the first electrostatic field.

The use of large particle toner 121 may require that the field exerted during transfer of the second toner image be less than that used to transfer the first toner image. This is because the Paschen discharge limit varies inversely with the size of the air gap between an image bearing surface such as the surface of the primary imaging member or the toner image bearing intermediate transfer member and the final receiver.

The use of large particle toner 121 also enables development using toner particles that have a lower overall charge. This lower overall charge advantageously creates the opportunity for an improvement in the amount of large particle toner that can be developed. In this regard, it will be understood that at a constant difference of potential between the primary imaging member and a development roller, the amount of large particle toner 121 deposited decreases with increasing toner charge to mass ratio. This is because the electrostatic field that allows development to occur decreases as the charged toner particles are deposited on the primary imaging member. Where a lower charged toner particle can be used, the number of toner particles that can be deposited on the primary imaging member used in developing such toner can increase. Increased toner transfer allows greater per unit concentration of large particle toner 121 enabling for example the creation of a larger toner stack heights in a single pass.

This increase in concentration can be usefully employed toward forming higher toner stack heights, such as for forming images with surface relief features that can be sensed using tactile senses. For example, when the first toner image is transferred to the receiver, then the second toner image is transferred onto the first toner image and the combination is then fused, the second toner image forms an outer surface of the toner image. In such a case, areas of the second toner image that have a first range of large particle toner 121 densities form a reference surface while areas of the second toner image having a second higher range of toner densities can create areas that project above the reference surface. The extent to which this projection occurs is a function therefore of the concentration of second toner that can be achieved during a single development step. Thus, higher toner stack heights and higher projection from the reference surface are possible.

Further, to the extent that there are a variety of factors that limit the amount of field strength that can be applied between the shell and the photoconductor during development and that transfer of charged particles from the development station to the PIM during development reduces the field between the two. To the extent that the large particle toner 121 can be transferred having lower charge it becomes possible to transfer a greater volume or greater degree of variation in the delivered volume of large particle toner 121 during development than is possible with higher charged large particle toner 121 therefore toner stack heights can be made greater for this reason as well.

These effects can be used to enable creation of toner images with large particle toner providing single layer thicknesses of any number of multiples of the diameter of the large particle toner particles. Although there will be some flattening of the toner particles during fusing, these effects can be used to create projections that extent above the reference surface by at least 20 um after fusing.

The use of the large particle toner 121 also allows the particles of the large particle toner 121 to have lower repulsive charge and to be positioned more closely than equivalent toner particles of the same median volume weighted diameter. Accordingly, a second toner image can include portions having toner concentrations of the large particle toner 121 per unit area that are greater than a concentration of toner particles that can be achieved using toner particles are equivalent to the large particle toner particles but that have a higher average charge-to-mass ratio. Similarly, this also allows the second toner image to have a packing density of the particles of the large particle toner 121 that is greater than can be formed using a toner that is equivalent to the particles of the large particle toner 121 and that have a higher average charge-to-mass ratio.

Figure 6:
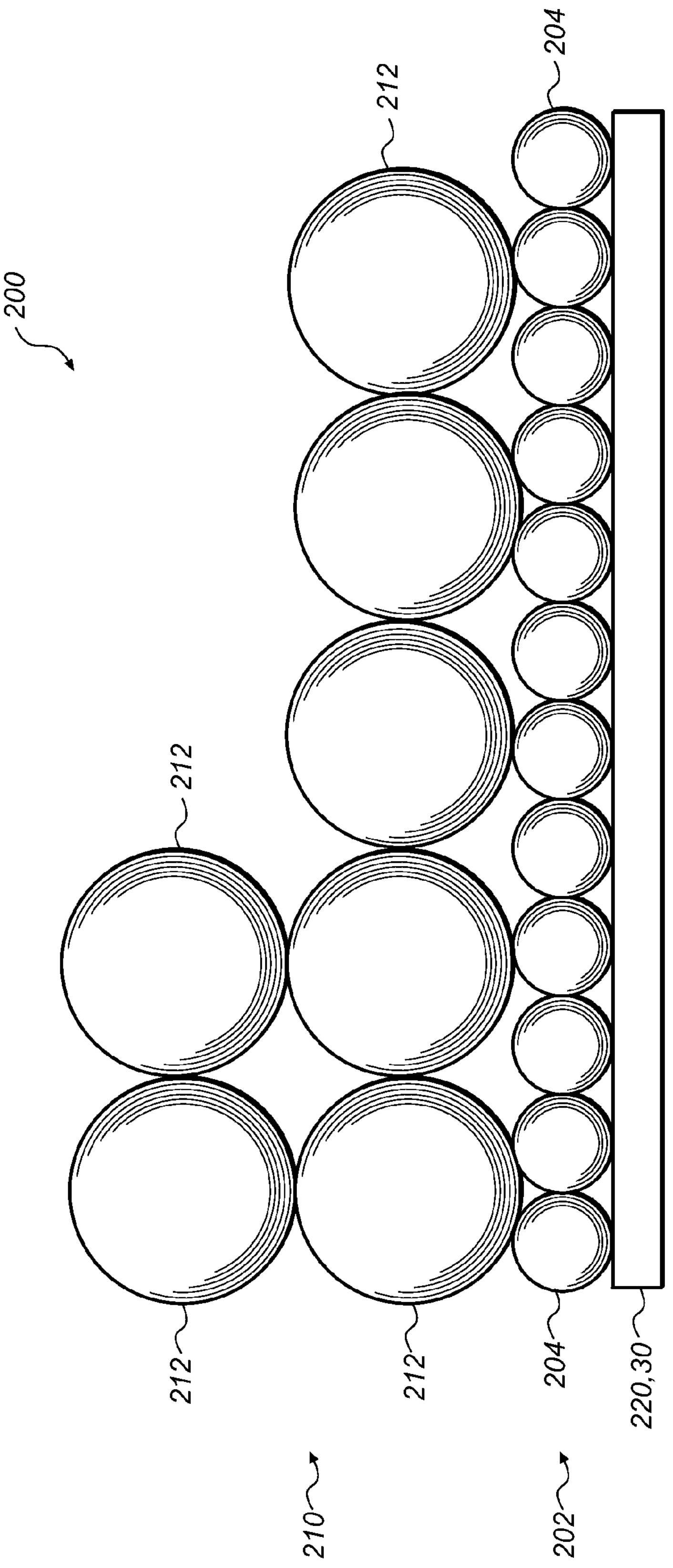
FIG. 6 shows an embodiment of a printed article.

FIG. 6 shows one example of a printed article 200 formed as described above. As is shown in FIG. 6, printed article 200 comprises a first toner image 202 of first toner particles 204 having a charge-to-mass ratio and a median volume weighted diameter between 3 and 9 um, a second toner image 210 of second toner particles 212 having a second charge-to-mass ratio that is between ⅓ to ½ of the first charge to mass ratio of the first toner times the ratio of the median volume weighted diameter of the first toner to the median volume weighted diameter of the second toner. In the embodiment illustrated in FIG. 6, first toner image 202 and second toner image 210 are formed on a receiver 220 that takes the form of a final receiver 44. However, in other embodiments receiver 220 can comprise an intermediate transfer member 30.

Figure 7:
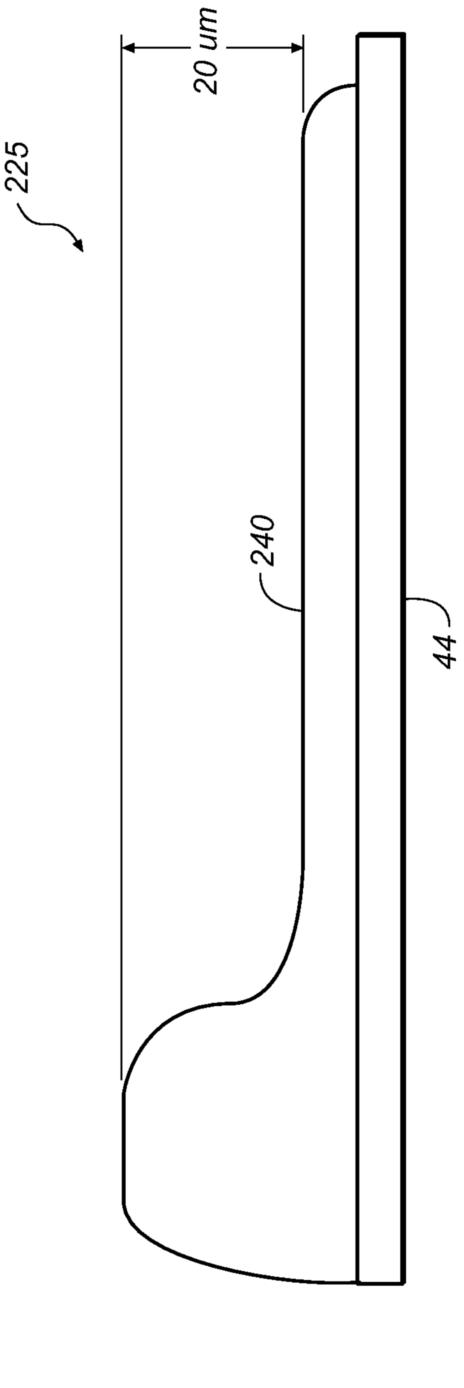
FIG. 7 shows the embodiment of FIG. 6 after fusing.

As is shown in the embodiment of FIG. 6, first toner image 202 is positioned on receiver 220 and second toner image 210 is positioned on first toner image 202. Areas of second toner image 210 have a first range of concentrations of large toner particles to form a reference surface 240 of a fused image 225 shown in FIG. 7 that is formed when the first toner image and the second toner image are fused to final receiver 44. As can be seen from FIG. 7, in this embodiment, areas of the second toner image 210 that form the second higher toner concentration of large particles create areas that project above the reference surface by at least 20 um after fusing. However the extent of this projection is exemplary only. Higher projections are possible depending on the median volume weighted diameter of the second toner particles 212 used in second toner 121.

The ability to form such toner heights in a single pass can be achieved, at least in part by forming second toner image 210 including portions having toner densities of the second toner particles that are greater than a density of toner particles that are equivalent to the second toner particles and that have a higher average charge-to-mass ratio. This is because, for the reasons that are discussed above, it is possible to form a second toner image having particles with weaker Culombic repulsion and therefore it is possible to achieve higher concentrations of the larger toner particles 212. For similar reasons, it is possible to create a printed article having a packing densities of the second toner particles that are greater than can be formed using toner particles that are equivalent to the second toner particles and that have a higher average charge-to-mass ratio.

The invention has been described in detail with particular reference to certain preferred embodiments thereof, but it will be understood that variations and modifications can be effected within the scope of the invention

What is claimed is:

1. A printer comprising:

a printer controller causing a first imaging module to form a first toner image using a first toner particle having a first charge-to-mass ratio and a median volume weighted diameter between 3 and 9 um; and a second imaging module to form a second toner image using second toner particles having a median volume weighted diameter that is greater than 20 um and a charge-to-mass ratio that is between ⅓ to ½ of the first charge to mass ratio of the first toner times the ratio of the median volume weighted diameter of the first toner to the median volume weighted diameter of the second toner;

wherein the controller further causes the first toner image to be transferred to a receiver using a first electrostatic field and the second toner image to be transferred to the receiver using a second electrostatic field.

2. The printer of claim 1, wherein the first toner image is transferred to the receiver and the second toner image is transferred onto the first toner image, and wherein areas of the second toner image have a first range of second toner concentrations to form a reference surface of a fused image formed using the first toner image and the second toner image, and wherein areas of the second toner image having a second higher range of toner concentrations create areas that project above the reference surface.

3. The printer of claim 2, further comprising a fuser for fusing the toner images to the receiver and wherein the areas of the second toner image having the second higher range of toner concentrations project above the reference surface by at least 20 um after fusing.

4. The printer of claim 1, wherein the second toner image includes portions having toner concentrations of the second toner particles per unit area that are greater than a concentration of toner particles that can be achieved using toner particles are equivalent to the second toner particles and that have a higher average charge-to-mass ratio.

5. The printer of claim 1, wherein the second toner image has a packing density of the second toner particles that is greater than can be formed using a toner that is equivalent to the second toner image and that have a higher average charge-to-mass ratio.

6. The printer of claim 1, wherein said controller causes a first development station to use a first toner charging process to charge the first toner particles to the first charge-to-mass ratio and a second development station to use a second toner charging process to charge the second toner particles to the second charge-to-mass ratio, wherein the second charging process creates more charge in the second toner particles than the first charging process creates in the first toner particles.

7. The printer of claim 1, wherein a first transfer distance is used to transfer the first toner onto a receiver and a second transfer distance to transfer the second toner onto a receiver, wherein the first transfer distance is less than the second transfer distance and wherein a second field strength of an electrostatic field used to transfer the second toner particles across the second transfer distance is lower than a first field strength of an electrostatic field used to transfer the first toner particles.

8. The printer of claim 1, wherein the second toner is transferred before the first toner.

9. A printer comprising:

a first development station operated by a printer controller to mix first toner particles with carrier particles to form a first developer having a determined ratio of toner and carrier and having first toner particles with a first charge-to-mass ratio;

a first primary imaging member, a first charge member and a first writer for recording a first electrostatic charge image on the first primary imaging member to create a difference of potential between the first development station and the first primary imaging member that creates a first electrostatic field that urges the first toner to transfer across a first transfer distance;

a second development station operated by a printer controller to mix second toner particles with carrier particles to form a second developer having a determined ratio of second toner particles and carrier and having second toner particles with a second charge-to-mass ratio; and a second primary imaging member, a second charge member and a second writer for recording a second electrostatic charge image on the second primary imaging member to create a difference of potential between the second development station and the second primary imaging member that creates a second electrostatic field that urges the second toner to transfer across a second transfer distance;

wherein the second toner particles have a median volume weighted diameter of greater than 20 um, the first toner particles have a median volume weighted diameter between about 3 um to 9 um and wherein the second transfer distance is greater than the first transfer distance but the second toner particles are treated with a charge control agent and a particulate addenda allowing the transfer of the second toner particles with the second electrostatic field to be less than the first electrostatic field.

10. The printer of claim 9, wherein the first toner image is transferred to the receiver and the second toner image is transferred onto the first toner image and wherein areas of the second toner image have a first range of second toner concentrations to form a reference surface of a fused image formed using the first toner image and the second toner image and wherein areas of the second toner image having a second higher range of toner concentrations create areas that project above the reference surface.

11. The printer of claim 10, further comprising a fuser for fusing the toner images to the receiver and wherein the areas of the second toner image having the second higher range of toner concentrations project above the reference surface by at least 20 um after fusing.

12. The printer of claim 9, wherein the second toner image includes portions having toner concentrations of the second toner particles per unit area that are greater than a concentration of toner particles that can be achieved using toner particles that are equivalent to the second toner particles and that have a higher average charge-to-mass ratio.

13. The printer of claim 9, wherein the second toner image has a packing density of the second toner particles that is greater than can be formed using a toner that is equivalent to the second toner image and that have a higher average charge-to-mass ratio.

14. The printer of claim 9, wherein said controller causes a first development station to use a first toner charging process to charge the first toner particles to the first charge-to-mass ratio and a second development station to use a second toner charging process to charge the second toner particles to the second charge-to-mass ratio, wherein the second charging process creates more charge in the second toner particles than the first charging process creates in the first toner particles.

* * * * *